M. LACHMAN.
METHOD OF JOINING METAL PLATES.
APPLICATION FILED JUNE 19, 1918.

1,294,679.   Patented Feb. 18, 1919.

INVENTOR
Maurice Lachman.
BY
Townsend & Decker
ATTORNEYS

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

METHOD OF JOINING METAL PLATES.

1,294,679. Specification of Letters Patent. Patented Feb. 18, 1919

Application filed June 19, 1918. Serial No. 240,778.

*To all whom it may concern:*

Be it known that I, MAURICE LACHMAN, a citizen of the United States, and a resident of New York, in the county of New York and State of New York, have invented certain new and useful Improvements in Methods of Joining Metal Plates, of which the following is a specification.

My present invention relates to a method for joining metal plates by means of rivets welded to at least one of the plates.

The invention is particularly useful for and applicable to the joining of heavy plates such as ship plates and has for its object to avoid the necessity of providing alined holes in the plates as in ordinary riveting and to permit the plates to be joined by electrically welded rivets in a quick and efficient manner.

In joining plates in the usual ship construction by rivet heads on opposite surfaces of the plates it is necessary to provide holes in both plates to be joined through which the rivets pass. The plates are heavy and the holes are formed in the mill before shipment of the plates to the yard. The plates lie around in the yard after delivery and before being joined together in constructing the ship When assembling the plates for joining great trouble is experienced due to the fact that the holes do not exactly line up. Then again, the temperature so affects the plates that the holes are thrown out of alinement even after the plates have been riveted at some places.

According to the present invention the trouble with alined holes is entirely overcome by providing rivet holes in but one of the plates. The rivet is inserted through this hole and welded to the other plate by the electric welding process. To assist the welding action the imperforate plate is provided with an isolated or partially isolated portion which isolation is effected after the plates are assembled so that it is assured that such isolation occurs at the proper place.

The invention consists in the improved method of joining plates hereinafter more particularly described and then set forth in the claims.

In the accompanying drawings, Figure 1 is a cross-section through two superposed plates to be joined in accordance with this invention.

Figure 1:
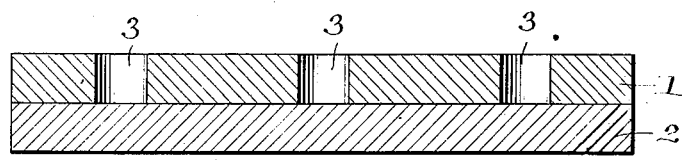
Figure 2:
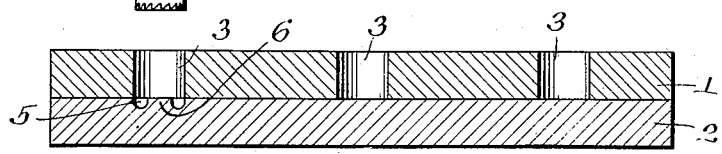
Fig. 2 is a similar view showing a later stage in the operation.
Figure 3:
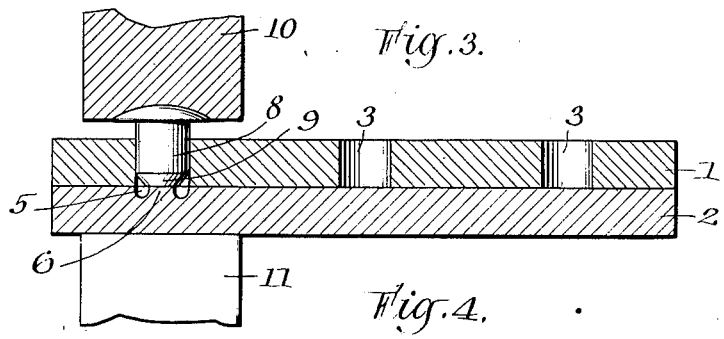
Fig. 3 is a similar view showing the joining rivet in place prior to welding—the welding electrodes or dies being indicated diagrammatically.
Figure 4:
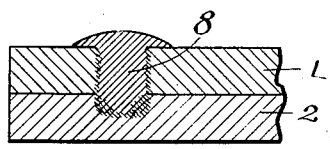
Fig. 4 is a cross-section through the completed joint.

The plates 1 and 2 are superposed one upon the other in the desired relation. The plate 1 is provided with a number of holes in the form of perforations 3, the plate 2 being imperforate at least in so far as any perforations designed to coöperate with the holes 3 to join the plates are concerned.

After the plates are superposed in proper relation, a cutting tool such a reamer 4 is inserted in one of the holes 3 and cuts an annular groove 5 in the surface of the plate 2 in line with the hole 3. The formation of the groove 5 leaves a projection 6 isolated from the surface of the plate 2 by the groove 5. The reamer 4 is driven by the portable electric motor 7 and the whole operation of forming the projection 6 takes an inappreciable time.

After withdrawing the reamer 4 a rivet blank 8 preferably headed at one end and having a tapered end 9 is inserted in the hole 3 and its tapered end butted against the projection 6. The whole is engaged by electric welding dies 10 and 11 engaging the work preferably from opposite sides. Current is passed from one die to the other through the work in a manner well known to those skilled in the electric welding art. As the current passes through the work the tapered end of the rivet and the projection 6 becomes plastic and pressure being applied to the rivet by the die 10 the metal is upset and welds together, the resulting bur filling the groove 5. Owing to the restricted contact of the tapered rivet end and the plate 2 due to the isolation of the projection 6, the parts are quickly brought to welding heat which heat also causes the shank of the rivet and the surrounding walls of the hole 3 to become more or less plastic and the application of the pressure to the rivet head somewhat bulges the shank laterally and a sticking or welding of the shank to the walls of the hole in the plate 1 is obtained although this is not depended upon for securing the plate 1 as the rivet head and welded end 9 effectually secure the plates together.

The operation is repeated at each hole 3; the reaming operation taking but an instant or two is preferably done immediately before it is desired to do the welding at each hole.

It will be understood that a countersunk rivet may be employed and the rivet may or may not be welded to the plate 1 around the walls of the hole 3. Also various other ways of forming the isolated projection on the plate 2 as well as other methods of applying the welding dies or electrodes may be resorted to without departing from the spirit of the invention as set forth in the appended claims.

What I claim as my invention is:—

1. The method of joining metal plates, consisting in providing one of them with a perforation, superposing one plate on the other, then forming a projection on the imperforate plate, inserting a rivet blank in said perforation with its end against said projection and welding the rivet to the projection.

2. The method of joining plates, consisting in superposing a perforated plate against an imperforated plate, then suitably isolating a portion of the imperforate plate in line with a perforation of the first named plate, inserting a rivet blank through the perforation and into abutted engagement with the isolated portion of the imperforate plate and welding said rivet to said isolated portion.

3. The method of joining plates, consisting in superposing a perforated plate on an imperforate plate, then forming an annular groove in the imperforate plate in line with a hole in the perforated plate, inserting a rivet blank through a hole in the perforated blank and welding it to the metal of the imperforate plate bounded by the said groove.

4. The method of joining metal plates, consisting in superposing a perforated plate on an imperforate plate, then removing a portion of the surface of the imperforate plate in line with a hole in the perforated plate to leave a portion of said plate partially isolated, inserting a headed rivet blank through the hole and into abutted engagement with the isolated portion of the imperforate plate and electrically welding the abutted rivet end to the imperforate plate.

5. The method of joining metal plates, consisting in superposing a perforated plate on an imperforate plate, then cutting away a portion of the imperforate plate to leave an isolated projection in line with a hole in the perforated plate, inserting a rivet blank having a tapered end through the hole and into abutted engagement with said projection and electrically welding said blank to said plates as and for the purpose described.

6. The method of joining metal plates, consisting in superposing a perforated and an imperforate plate, inserting a cutting tool through a hole in the perforated plate and removing a portion of the surface of the imperforate plate, withdrawing said tool, inserting a rivet blank through said hole and abutted against the imperforate plate and electrically welding the rivet blank to the imperforate plate.

Signed at New York, in the county of New York and State of New York, this 15th day of June, A. D. 1918.

MAURICE LACHMAN.

Witnesses:
  F. G. TOWNSEND,
  F. E. ROESLERS.